Patented June 22, 1948

2,443,825

UNITED STATES PATENT OFFICE 2,443,825

TREATMENT OF FERMENTATION LIQUORS

Harold G. Johnson, Terre Haute, Ind., assignor to Commercial Solvents Corporation, Terre Haute, Ind., a corporation of Maryland No Drawing. Application May 4, 1945,
Serial No. 592,068

8 Claims. (Cl. 195—36)

This invention relates to a method for reducing foaming and emulsification difficulties in fermentation processes, and in the handling of the fermentation liquors resulting therefrom. It relates more particularly to the minimizing of these difficulties as related to the production and recovery of penicillin material.

It has recently been discovered that when molds of the type of Penicillium notatum, Penicillium chrysogenum and the like are propagated on certain nutrient media, they produce a material of unknown composition called penicillin which has valuable anti-bacterial properties useful in combating certain infections.

The organisms Penicillium notatum, Penicillium chrysogenum etc. are aerobic organisms and require oxygen for growth and penicillin production. Early propagation of the mold, therefore, was carried out on the surface of the nutrient media and these surfaces were exposed to the atmosphere.

When it became desirable to produce penicillin on a large scale, a process of subsurface culture was developed, in which the Penicillium mold organism is grown in large vats throughout the body of the culture liquor, and oxygen is furnished to the organism by means of aeration in which air is bubbled through the mass of culture liquor or the like. The introduction of aeration, however, caused the culture liquor to foam so severely that often the entire contents of a fermenter would be lost through foaming and overflowing of the culture liquor.

Difficulties of the same nature were also encountered in certain recovery steps used to extract the penicillin material from the culture liquor. For example, when a liquid-liquid counter-current extraction was practiced, not only foaming, but also emulsification of the culture liquor with the extraction solvent caused serious mechanical difficulties involving loss of therapeutically active penicillin material in the foam, and furthermore resulted in serious delays in the formation and separation of the several liquid layers on which this process depends. The prolongation of the time of solvent extraction was a serious drawback, because at the acid conditions under which the solvent extraction must be carried out to obtain solubility of the penicillin material in the organic solvent, the penicillin activity is very unstable, even under conditions of reduced temperature, so that this extraction step should be carried out in the shortest possible time, and any prolongation of the time results in serious additional losses of the valuable penicillin activity.

I have now found that foaming and emulsification of fermentation liquors, and especially of penicillin culture liquors, can be controlled, and substantially prevented by my invention in which small quantities of an oxazoline product to be described hereinafter are added either alone or in a carrier medium to the culture liquor at the desired stage.

The oxazoline product referred to comprises primarily a compound having the following structural formula:

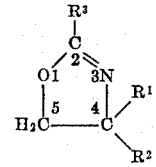

in which $R^1$ and $R^2$ may be hydrogen, alkyl or hydroxymethyl; and $R^3$ is an alkyl radical having from 7 to 17 carbon atoms inclusive. These compounds may be prepared by the reaction, and concomitant distillation of 2 moles of water from, a mixture of 1 mole of a fatty acid having from 8 to 18 carbon atoms inclusive and 1 mole of an amino hydroxy compound having the following structural formula:

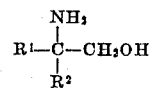

in which $R^1$ and $R^2$ represent hydrogen, alkyl or hydroxymethyl, said reaction and distillation taking place during the time the temperature of the reaction mixture is raised from 150° C. to 240° C.

Examples of such oxazoline products are 2-heptadecyl-4-methyl-4-hydroxymethyl-2-oxazoline; 2-hendecyl-4-ethyl-4-hydroxymethyl-2-oxazoline; 2-heptadecenyl-4-methyl-4-hydroxymethyl-2-oxazoline; 2-pentadecyl-4-ethyl-4- methyl-2-oxazoline; 2-heptyl-4-hydroxymethyl-4-methyl - 2 - oxazoline; 2-octyl-4,4-dimethyl-2-oxazoline; 2-octadecyl - 4,4 - dihydroxymethyl-2-oxazoline; 2-octadecyl-2-oxazoline, and the like.

These oxazoline compounds may be used in accordance with my invention in the pure state, but they are equally effective if used in the crude, unpurified state upon completion of the distillation of two moles of water from the mixture of fatty acid and amino alcohol as described above. Likewise, unpurified mixtures of fatty acids may be used to prepare the oxazoline reaction products.

Especially effective in my process are the reaction products under the conditions described, of 1 mole of oleic acid with 1 mole of 2-amino-2-methyl-1,3-propanediol, i. e. crude 2-heptadecenyl-4-hydroxymethyl-4-methyl-2-oxazoline, and also those products prepared by the reaction of coconut fatty acids and tall oil fatty acids with 2-amino-2-methyl-1,3-propanediol.

The oxazoline product is oil soluble, and accordingly may conveniently be used in an oil carrier such as mineral oil or the like, particularly for controlling foam, whereas for suppression of emulsions, it is usually more convenient to add the oxazoline product alone as in such cases an oily phase is usually already present.

In practicing my invention the fermentation medium is placed in a so-called "cooker" tank for heat sterilization, and after sterilization, the liquor is cooled, usually to room temperature, transferred to a fermenter, and is aseptically inoculated with the organism. Aeration is started, and if foaming occurs a small quantity of oxazoline material is added to the fermenter. Without my antifoaming agent, the foam production is often so great that even if the fermenter is only partially full at the start, the foam rises to the top of the tank and in many cases overflows, resulting in loss of the culture liquor and in almost certain contamination of the initially sterile charge, and consequent cessation of growth and destruction of the penicillin already formed.

When small quantities of the oxazoline material are added to the foaming fermenter charges, immediate diminution of the foaming results, and usually complete suppression of the foam so that overflowing and resulting loss and contamination are substantially completely prevented.

The use of my anti-foaming agent enables the fermenters to be filled more nearly full and increases efficiency of operation while minimizing losses and contamination as described.

The crude oxazoline product described may be used alone according to my invention to suppress foaming and emulsification, or it may conveniently be mixed with a lighter-than-water carrying agent such as mineral, vegetable or animal oil to aid in distributing the anti-foaming agent over the surface of the fermenter where it may act to continuously prevent the formation of foam. While animal or vegetable oils may be used as carriers, I prefer to use mineral oil as it is available, cheap, and inert to the biological process of the fermentation. I have found mixtures of 50% oxazoline material and 50% mineral oil to be effective although other proportions can also be utilized with good results.

The amount of oxazoline material used will vary with the foaming tendency of the particular batch, some batches requiring a greater quantity than others. Certain fermenters may not foam seriously during part of the fermentation period, which may last for several days, and start foaming badly at other stages. Whenever serious foaming occurs, it may be readily controlled and substantially completely suppressed by the addition of the oxazoline product mixture.

As illustrative of the suppression of foam under various conditions of aeration, Table I below lists the time after the beginning of the fermentation cycle at which a 10 gallon charge of a 50-50 mixture of the oxazoline oleate derivative described above was added to a 12,000 gallon fermenter filled to 8,600 gallons working charge. In the first three runs listed it was necessary to make only a single addition of antifoam at the time indicated, and this single addition was effective in suppressing the foam for the remainder of the 86-90 hour fermentation period. In the fourth run, however, at a high airflow rate, the antifoam charge was only temporarily effective in suppressing foam, and as foaming recurred, repeated additions of antifoam were made.

TABLE I

| Run No. | Pressure, lb./sq. in. | Airflow, cu. ft./min. | Temp., °C. | Time (hr.) of Antifoam Addition |
|---|---|---|---|---|
| 1 | 5 | 325 | 24 | 84 |
| 2 | 10 | 325 | 24 | 60 |
| 3 | 10 | 288 | 24 | 2 |
| 4 | 15 | 325 | 24 | 48, 56, 70, 86 |

In order to illustrate the quantitative effects of various amounts of oxazoline products of various types in conjunction with different kinds and quantities of oils, tests were run as described below using oxazoline products prepared as described from 2-amino-2-methyl-1,3-propanediol and oleic acid; tall oil fatty acids; and coconut oil fatty acids respectively in conjunction with mineral oil, castor oil and sulfonated castor oil.

The tests were carried out by adding 300 ml. of penicillin culture liquor or "beer" to a 1-liter graduate and blowing air through a Norton disperser in the graduate at the rate of 0.04 cubic ft. per minute. Under these conditions, when no antifoam agent was added the "beer" foamed so excessively that within a few minutes it had completely overflowed the graduate, and the entire charge of liquor was lost. Antifoam was added as necessary to keep the foam below the 500 ml. level on the graduate. The experiments were ordinarily run for 3 hours, but in some cases where the antifoam showed very slight activity the experiments were shorter. Three tests were run simultaneously, and in every set of three experiments one was included with the 10-90 mixture of oleic acid oxazoline product with mineral oil as a standard to evaluate the beer being used. The average of 25 experiments show that 0.17 ml. of this mixture was required for a 3 hour period, and this figure was used to correct the amounts of other antifoam agents to make the results comparable. For example, if 0.1 ml. of the 10-90 mixture of oleic acid oxazoline product with mineral oil was used for a sample of beer, and if 0.3 ml. of another antifoam were required, the figure reported for the second antifoam would be $$0.3 \cdot \frac{.17}{.1} = 0.5 \text{ ml.}$$

Figures up to 0.3 under the conditions of the test represented excellent foam suppression properties.

The experimental results are tabulated below. Percentages are by volume.

TABLE II

*Quantitative evaluation of effects of addition of various oxazoline product-carrier oil mixtures on foaming of penicillin liquors*

| Per cent Oxazoline Product in Carrier Oil | Amount of Antifoam Mixture Required in ml. to Keep Foam Below 500 ml. Level [1] | | | | | | | | |
|---|---|---|---|---|---|---|---|---|---|
| | Reaction Product of 2Me-2NH$_2$-1,3-Propanediol and Oleic Acid With— | | | Reaction Product of 2Me-2NH$_2$-1,3-Propanediol and Tall Oil Acids Mixed With— | | | Reaction Product of 2Me-2NH$_2$-1,3-Propanediol and Coconut Oil Acids Mixed With— | | |
| | Mineral Oil | Castor Oil | Sulf. Castor Oil | Mineral Oil | Castor Oil | Sulf. Castor Oil | Mineral Oil | Castor Oil | Sulf. Castor Oil |
| 0 | 0.5 | 2.0 | 3.0 | 0.5 | 2.0 | 3.0 | 0.5 | 2.0 | 3.0 |
| 2 | 0.3 | 0.9 | 3.0 | 0.3 | 2.0 | 3.0 | 0.8 | 0.04 | 3.0 |
| 5 | 0.2 | 1.2 | 3.0 | 0.3 | 1.4 | 3.0 | 0.5 | 0.2 | 3.0 |
| 10 | 0.17 | 0.9 | 3.0 | 0.3 | 1.0 | 2.0 | 0.2 | 0.1 | 3.0 |
| 25 | 0.4 | 0.3 | 3.0 | 0.3 | 1.2 | 1.7 | 0.2 | 1.3 | 2.0 |
| 50 | 0.3 | 0.3 | 3.0 | 0.2 | 0.7 | 1.9 | 0.1 | 1.7 | 0.2 |
| 75 | 0.14 | 0.2 | 3.0 | 0.2 | 1.4 | 0.9 | 0.04 | 0.2 | 0.2 |
| 100 | 0.4 | 0.4 | 0.4 | 1.4 | 1.4 | 1.4 | 2.4 | 2.4 | 2.4 |

[1] The lower the value listed, the better the antifoam properties.

To further illustrate this phase of my invention the following example is given.

EXAMPLE I

A fermenter of 60 gallons capacity and a cross section area of about 3 square feet was filled with about 40 gallons of sterile culture liquor and inoculated with a culture of *Penicillium notatum*. Aeration was started and in a few minutes foam had formed and had risen nearly to the top of the fermenter tank. At this stage, 500 milliliters of a 50–50 mixture of mineral oil and the crude reaction product of 1 mole of oleic acid with one mole of 2-amino-2-methyl-1,3-propanediol prepared as described was added to the fermentation liquid aseptically through the inoculum opening. Almost immediately the foam subsided, and no further trouble with excessive foaming was encountered throughout the fermentation period of about 5 days.

In accordance with another phase of my invention I find that I can effectively suppress foaming or emulsification or a mixture of both occurring in the penicillin material fermentation liquor or so-called "beer," during handling to recover the active penicillin material therefrom.

In the growth of the *Penicillium notatum* or the like above referred to, the quantities of active penicillin material produced are so minute in comparison to the quantities of fermentation liquor in which it is formed, that a number of complicated concentration and purification steps must be employed to recover the therapeutically active material in concentrations and degree of purity in which it is suitable for administration to human patients. In one such recovery process, the crude fermentation liquor or "beer" containing the penicillin material is treated with an organic, water-immiscible solvent by countercurrent, liquid-liquid extraction in which the watery beer is passed under pressure through a column of the solvent phase to transfer the penicillin material from the watery fermentation liquor phase to the solvent phase. At this stage not only foaming of the beer occurs to retard dispersion and passage of the beer droplets through the solvent, but severe emulsification of the watery beer with the water-immiscible organic solvent takes place, leading to mechanical difficulties in separation of the two phases, and prolonging the time during which the sensitive penicillin material must remain under the unstabilizing acid conditions of the extraction process.

At this stage, the addition of small quantities of my oxazoline material anti-foaming agent described are effective to reduce to the point of substantial elimination both the undesirable foaming and emulsification difficulties.

As illustrative of this phase of my invention the following example is given.

EXAMPLE II

To a batch of penicillin-containing fermentation liquor measuring 3,000 parts by volume designed to be relieved of its penicillin material by liquid-liquid extraction, was added 15 parts by volume of the reaction product of 1 mole of oleic acid with 1 mole of 2-amino-2-methyl-1,3-propanediol. The treated fermentation liquor was then cooled to about 10° C., acidified to a pH of 2.5 and passed dropwise through an upwardly flowing column of amyl acetate where it was relieved of the greater portion of its penicillin material. No foaming of the "beer" was encountered, and emulsification of the watery "beer" with the water-immiscible amyl acetate was at a minimum, so that the upward flow of the amyl acetate was at a rate of 9.45 cubic feet per hour per square foot of cross section, while beer flow was at the rate of 40.7 cu. ft. per hour.

A portion of the same batch which received no treatment foamed and emulsified so badly that it would not flow at all so that the column clogged completely and was virtually inoperable.

Although the above constitutes the preferred embodiments of my invention, it will be understood that departures may be made therefrom within the scope of the specification and claims.

What is claimed is:

1. In a process for producing therapeutically active penicillin material by the propagation of Penicillium molds in a culture liquor while simultaneously subjecting said culture liquor to subsurface aeration, the improvement which comprises suppressing the foaming of said culture liquor by adding thereto a small proportion of an oxazoline material comprising primarily a product having the following structural formula:

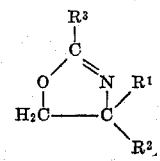

in which $R^1$ and $R^2$ are selected from the group consisting of hydrogen, alkyl, and hydroxymethyl; and $R^3$ is an alkyl radical having from 7 to 17 carbon atoms, inclusive.

2. In the manufacture of therapeutically active penicillin involving the steps of fermenting a culture liquid with a Penicillium mold while subjecting the culture liquid to subsurface aeration and then extracting the penicillin from the resulting fermentation liquor with an immiscible organic solvent, the improvement which comprises adding to at least one of the steps of said process a small amount of an oxazoline material comprising a compound having the structural formula:

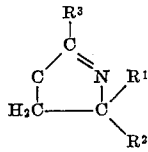

in which $R^1$ and $R^2$ are selected from the group consisting of hydrogen, alkyl and hydroxymethyl, and $R^3$ is an alkyl radical having from 7 to 17 carbon atoms, thereby suppressing foam formation.

3. The process of claim 2 wherein the said extracting step is a counter-current, liquid-liquid extraction and the added oxazoline material suppresses foam formation and also emulsification of the liquids.

4. The process of claim 2 wherein said oxazoline material comprises said oxazoline compound dissolved in an oil.

5. The process of claim 2 wherein said oxazoline material comprises said oxazoline compound dissolved in a mineral oil.

6. The process of claim 2 wherein said oxazoline compound is 2-heptadecenyl-4-hydroxymethyl-2-methyl-2-oxazoline.

7. The process of claim 2 wherein said oxazoline material comprises the reaction product of 2-amino-2-methyl-1,3-propanediol with coconut oil fatty acids.

8. The process of claim 2 wherein said oxazoline material comprises the reaction product of 2-amino-2-methyl-1,3-propanediol with tall oil fatty acids.

HAROLD G. JOHNSON.

REFERENCES CITED

The following references are of record in the file of this patent:

UNITED STATES PATENTS

| Number | Name | Date |
| --- | --- | --- |
| 2,309,243 | De Groote et al. | Jan. 26, 1943 |
| 2,399,840 | Wachtel | May 7, 1946 |
| 2,416,821 | Coulthard | Mar. 4, 1947 |

OTHER REFERENCES

"Evaluation of Antifoam Agents," Pencillin Research Progress Report No. 6, May 27, 1944. University of Wisconsin with O. P. R. D.

Pencillin Interim Report (44-35), May 2, 1944. The Pennsylvania State College, O. P. R. D.

Tretolite 1-27973.